Jan. 12, 1932. J. C. STELFOX 1,841,340
CONTROL APPARATUS FOR GAS MAKING MACHINES
Filed May 18, 1929 3 Sheets-Sheet 2
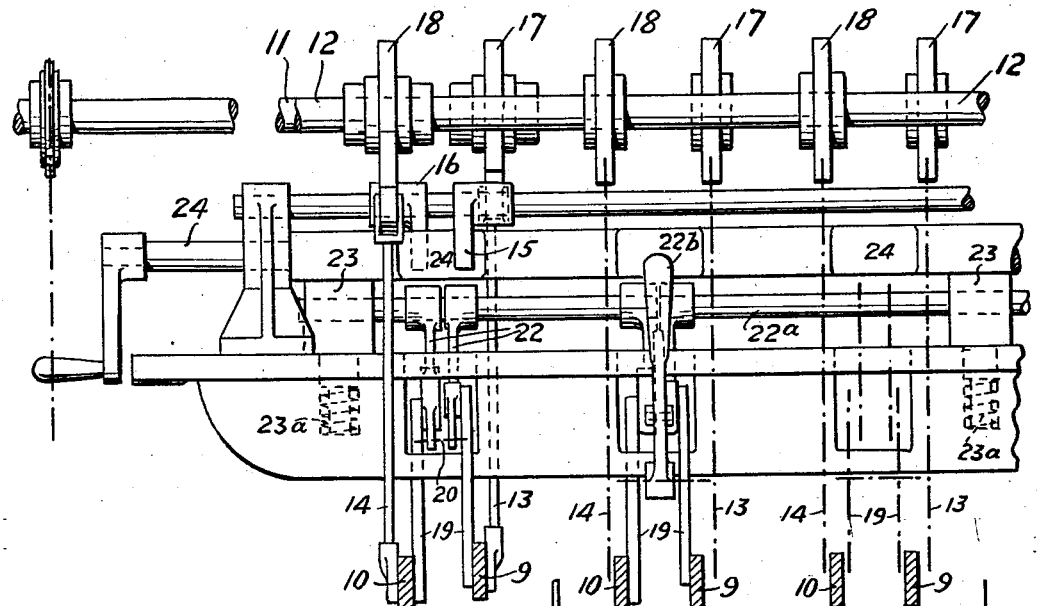
FIG.2.
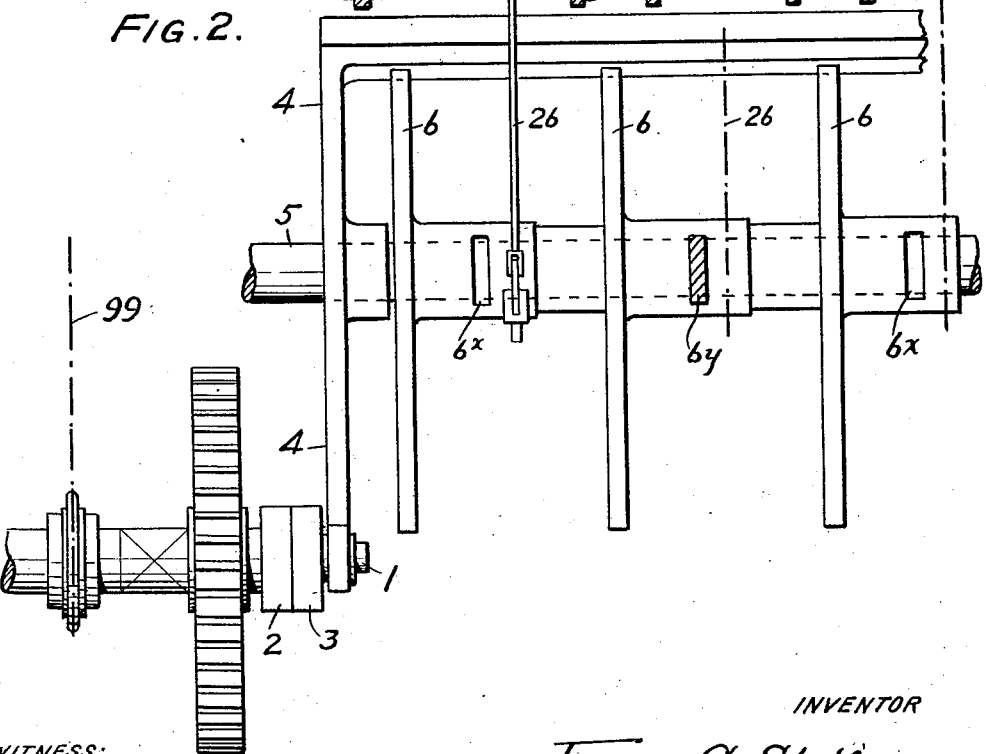
WITNESS:
INVENTOR
James C. Stelfox
BY
Augustus B. Stoughton
ATTORNEY.

Jan. 12, 1932.　　　　J. C. STELFOX　　　　1,841,340
CONTROL APPARATUS FOR GAS MAKING MACHINES
Filed May 18, 1929　　　3 Sheets-Sheet 3
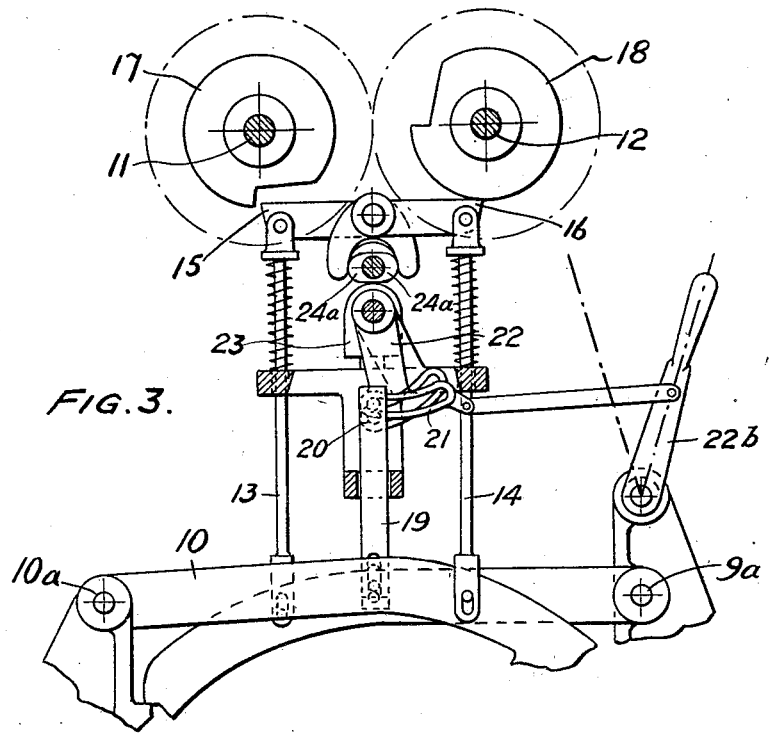
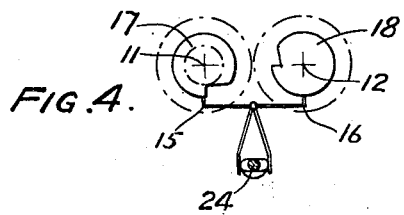
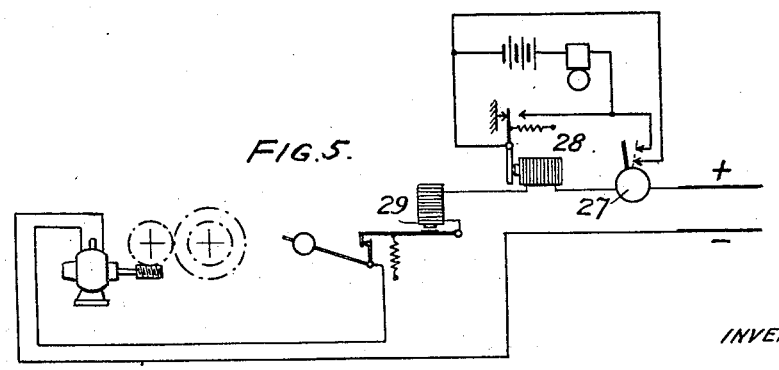
INVENTOR
James C Stelfox
BY
Augustus B. Broughton.
ATTORNEY.
WITNESS:

Patented Jan. 12, 1932

1,841,340

UNITED STATES PATENT OFFICE

JAMES C. STELFOX, OF WESTMINSTER, ENGLAND, ASSIGNOR TO UNITED ENGINEERS & CONSTRUCTORS INC., OF PHILADELPHIA, PENNSYLVANIA, A CORPORATION OF DELAWARE

CONTROL APPARATUS FOR GAS MAKING MACHINES

Application filed May 18, 1929, Serial No. 364,033, and in Great Britain May 23, 1928.

In the manufacture of water gas and in other processes certain operations have to be effected in recurring cycles, and the present invention has reference to mechanism for automatically actuating parts of the apparatus in which such processes are carried on so that the operations are changed at the required times and in the required order.

The object of the invention, which for convenience will be described in connection with water gas apparatus, is to provide improved mechanism in which a motor directly actuates the operating valves or other parts (hereinafter referred to as valves) and also actuates the mechanism (generally referred to as the automatic operator) which automatically controls the actuation of the valves.

One feature of the mechanism is the arrangement between each valve and a part, which has imparted to it by the motor a continuous to and fro movement, of a coupling device which is normally held out of action by the automatic operator and is released thereby so as to come into action only when the particular valve is to be moved.

A further feature is the provision of means for disconnecting the automatic operator from the coupling devices and for controlling by hand the action of the couplings so that the motor can be caused to actuate the valves at the will of the person in charge of the apparatus subject, of course, to any interlocking of the gear that may be provided.

Referring to the accompanying diagrammatic drawings,

Figs. 1 and 2 are sectional elevations at right angles to each other of so much of an apparatus as is necessary to illustrate the invention.

Fig. 3 is a similar view to Fig. 1 of parts of the apparatus shown therein in different positions; and Fig. 4 is a diagram of parts of the apparatus shown in Figures 1 and 3.

Fig. 5 is a diagram of an electric motor control circuit.

Figure 1:
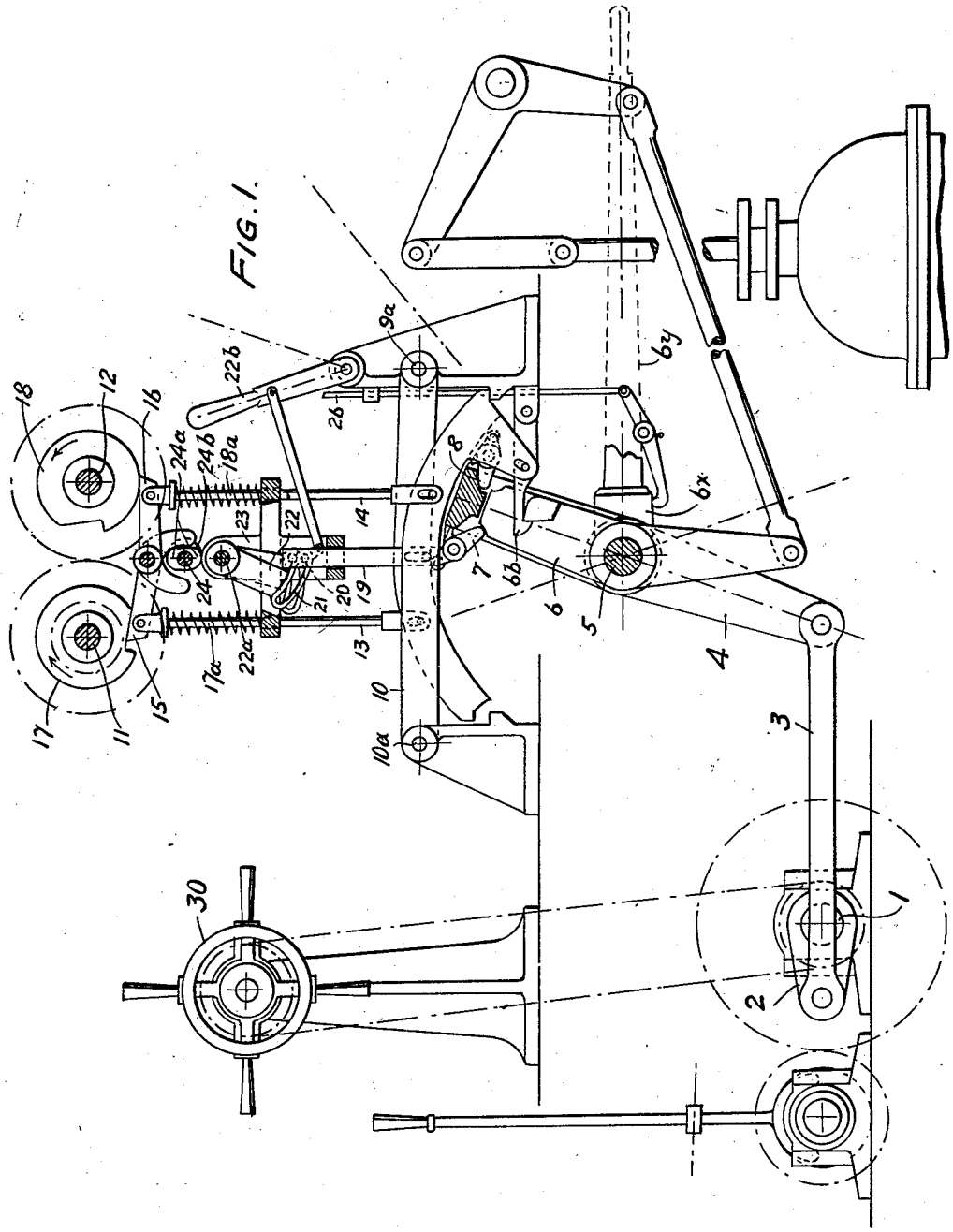

In this arrangement, the motor, not shown in Figs. 1 and 3, drives through worm or other suitable gear, a shaft 1 having a crank 2 carrying a connecting rod 3 pinned to a stirrup-shaped lever 4 mounted on a horizontal shaft 5 on which are also mounted a number of levers 6, each of the latter corresponding to one of the operating valves of the apparatus; the stirrup-shaped lever 4, which is rocked a considerable number of times during each cycle of operation, spans the valve levers 6 and has pivoted on opposite sides of its horizontal part and in line with the ends of the valve levers 6 pairs of pawls 7, 8 which tend to fall into engagement with the opposite sides of said lever ends, but are restrained from doing so by hinged cam bars 9, 10, which act on rollers carried by the tails of the pawls and are lifted by means of the automatic operator in the required times and order to enable the proper pawls to engage the proper valve levers so that the motor will move the required valves in the required direction. Figure 1 shows a valve lever 6 connected to a valve by an unnumbered linkage. There is one cam bar for each pawl and the arrangement is such that each lever 6 can only be engaged at one time by one of its pawls 7, 8; the cam bars of each pair are hinged at opposite ends at $9^a$, $10^a$. $6^b$ is a catch which engages each valve lever 6 when in the extreme position corresponding to the open position of the valve and prevents the valve closing until the catch is released by upward movement of the cam bar 10 to which it is connected by a pin and slot, as shown.

The automatic operator may comprise a pair of cam shafts 11, 12, geared together as is usual and may be driven from the crank shaft 1 by chain gear 99, as shown in Figure 2, so as to make one complete revolution for each cycle of the apparatus. The cam bars 9 and 10 are connected to rods 13, 14, pivoted to short levers 15, 16 which are caused to bear against the corresponding cams 17, 18 on the cam shafts 11, 12 by springs $17^a$, $18^a$ adjusted to overcome the weight of the cam bars &c. To enable the cam bars 9, 10 to be actuated by hand, each bar is provided with another lifting rod 19 supported by a pin 20 working in an eccentric slot 21 in an arm 22 mounted on a spindle $22^a$, carried in spring supported bearings 23; to raise or lower the cam bars, the arms are rocked by a hand lever 22$^b$. The eccentric slots 21 corresponding to the respective cam bars of each pair are so set that one cam bar will be raised and the other lowered by rocking the shaft 22$^a$. Pin and slot connections are provided between the cam bars and the rods 13, 14 and 19, there being greater play between the pins and slots of the hand operated rods 19 than between those of the rods 13, and 14; the bearings 23 of the hand lifting rods 19 are supported on springs 23$^a$ (see Fig. 2) and can be depressed by means of a cam shaft 24. The extra play permits the cam bars to be moved under the control of the automatic operator in the depressed positions of the bearings 23 but, when said bearings are not depressed, any cam bar, which is lowered can be freely raised by the hand lever through the action of the eccentric slot 21 on the pin 20.

This same cam shaft 24 may be adapted to act on the levers 15, 16 which bear on the automatic operator cams 17, 18 so as to suspend the action of the automatic operator, leaving the valves in the positions they then occupy, or to set all the valves to the "shut down" position, according to the direction in which the cam shaft is turned. The levers 15, 16 have downwardly extending tails lying on opposite sides of a double cam 24$^a$ on the shaft 24 which also has cams 24$^b$ above the bearings 23. If the shaft 24 be given a quarter turn in a clockwise direction from the direction shown in Fig. 1 into the position of Fig. 4, the double cam 24$^a$ will engage the tails of the levers 15, 16 and hold them out of engagement with the cams 17, 18 and the cams 24$^b$ will continue to hold down the bearings 23 with the result that the cam bars 9, 10 will be lowered and the pawls 7, 8 will be held out of engagement with the valve levers 6 so that the valves will be left in the positions they occupy at the moment the shaft 24 is turned. If the shaft 24 be given a quarter turn in the opposite direction from the position of Figure 1, the cam 24$^a$ will hold the levers 15, 16 out of engagement with the cams 17, 18 but the cams 24$^b$ will clear the bearings 23 so that the spindle 22$^a$ will rise thereby causing such movements of the cam bars 9, 10 as will set the valves to the shut down or safety positions.

When the valves are in the "shut down" position and the motor drive in operation, any valve can be caused to be opened or shut by operation of the corresponding hand lever; all hand levers should be in the shut down position when the automatic operator is in action and then do not move.

The hand levers are interlocked for safety and indicators, see 26 Fig. 1, are provided to show the positions of the valves.

Provision may be made for applying a hand lever directly to each valve lever to move same by hand. Fig. 1 shows the valve lever 6 formed with a socket 6$^x$ to receive a hand lever 6$^y$.

The crank shaft 1 is coupled to the drive by a suitable clutch and a flexible shock absorbing coupling, not shown.

The motor control is such that any appreciable overload, including that which would be caused by the failure of any valve to complete its stroke properly and in good time, will cause the sounding of an alarm and any further and dangerous overload will cut off current from the motor; by turning the cam shaft 24 into the hand operating position the valve lever pawl or coupling transmitting the overload can then be disengaged by operating the corresponding hand lever, when the motor can be again started and the rest of the valves moved to the shut down position by the motor under control of the hand operating gear. Failure of current supply will also sound an alarm.

In Fig. 5, 27 represents the overload alarm switch, 28 the current failure alarm switch and 29 the dangerous overload switch, opening of which cuts off the current. On the motor stopping after throwing out the motor clutch, the crank shaft can be rotated by means of a hand wheel 30 or handle applied to say, a part of the reduction gear and by operating the appropriate hand levers 22$^b$, the plant can be shut down to a safe position at once, or if the automatic operator be left in action, the gas making cycle can be completed before shutting down the plant.

Having now particularly described and ascertained the nature of my said invention and in what manner the same is to be performed, I declare that what I claim is:

1. Apparatus for mechanically operating a gas manufacturing plant comprising, in combination, a source of power, a member adapted to be moved continuously to and fro by said source of power, pawls mounted on said member, a valve lever, a valve, a direct mechanical linkage between said valve and said valve lever, and an automatic operator adapted to control said pawls and to move one of the pawls so as to connect said member and said valve lever so that the source of power then operates the valve in the desired direction at the proper rate and time.

2. Apparatus for mechanically operating a gas manufacturing plant according to claim 1 wherein the control of the pawls by the automatic operator may be suspended and the pawls controlled by hand so that the motor can be caused to actuate the valves at will.

3. Apparatus for mechanically operating a gas manufacturing plant according to claim 1 wherein the control of the pawls by the automatic operator can be suspended and simultaneously the pawls so set that the source of power will move the valve to "safety" or "shut down" position.

4. Apparatus for mechanically operating a gas manufacturing plant according to claim 1 wherein there are cam bars for controlling the pawls adapted to be controlled by the automatic operator or by hand.

5. Apparatus for mechanically operating a gas manufacturing plant comprising, in combination, a source of power, a stirrup-shaped lever adapted to be moved to and fro by said source of power, pairs of reversely mounted pawls on said lever, a plurality of valve levers spanned by said stirrup-shaped lever, cam bars for actuating said pawls by engagement therewith, an automatic operator for actuating said cam bars, a plurality of valves, and direct mechanical linkages between each of said valve levers and each of said valves, said pawls being actuated to connect said stirrup-shaped lever and one or more of said valve levers to provide a direct mechanical connection for actuating said valves from said source of power.

6. Apparatus for mechanically operating a gas manufacturing plant according to claim 5, said automatic operator including short rods attached to said cam bars, short cam levers attached to said rods, cams for actuating said cam levers, other rods connected to said cam bars, pins on said other rods, rocking arms having eccentric slots therein to receive said pins, a rocking shaft supporting said rocking arms, sliding bearings for said rocking shaft, cams for actuating said cam levers into operative connection with the first mentioned cams, cams for moving said sliding bearings, and means for actuating said pawls by hand when said sliding bearings are depressed.

7. Apparatus for mechanically operating a gas manufacturing plant comprising, in combination, a source of power, a member adapted to be moved continuously to and fro by said source of power, a valve lever, a valve, a direct mechanical linkage between said valve and said valve lever, pawls mounted to connect and disconnect said member and said valve lever, and an automatic operator adapted to control said pawls and to move one of the pawls so as to connect said member and said valve lever so that the source of power then operates the valve in the desired direction at the proper rate and time.

8. Apparatus for mechanically operating a gas manufacturing plant comprising, in combination, a source of power, a member adapted to be moved continuously to and fro by said source of power, a valve lever, a valve, a direct mechanical linkage between said valve and said valve lever, separate independent means for connecting said valve lever and said member, and an automatic operator adapted to control said means and to move one of said means so as to connect said member and said valve lever so that the source of power then operates the valve in the desired direction at the proper rate and time.

JAMES CALDWELL STELFOX.